US010926298B2

(12) United States Patent
Clark

(10) Patent No.: US 10,926,298 B2
(45) Date of Patent: Feb. 23, 2021

(54) HARD DRIVE DISMANTLING SYSTEM

(71) Applicant: Serenity Data Security, LLC, Carbondale, IL (US)

(72) Inventor: Kevin P. Clark, Carbondale, IL (US)

(73) Assignee: Serenity Data Security, LLC, Carbondale, IL (US)

( * ) Notice: Subject to any disclaimer, the term of this patent is extended or adjusted under 35 U.S.C. 154(b) by 702 days.

(21) Appl. No.: 15/516,609

(22) PCT Filed: Jul. 1, 2016

(86) PCT No.: PCT/US2016/040812
§ 371 (c)(1),
(2) Date: Apr. 3, 2017

(87) PCT Pub. No.: WO2017/004575
PCT Pub. Date: Jan. 5, 2017

(65) Prior Publication Data
US 2017/0297062 A1 Oct. 19, 2017

Related U.S. Application Data

(60) Provisional application No. 62/188,055, filed on Jul. 2, 2015.

(51) Int. Cl.
*B23C 3/00* (2006.01)
*C22B 59/00* (2006.01)
(Continued)

(52) U.S. Cl.
CPC .......... *B07C 5/3412* (2013.01); *B02C 18/06* (2013.01); *B02C 23/08* (2013.01); *B03B 9/061* (2013.01);
(Continued)

(58) Field of Classification Search
CPC ..... G11B 23/505; G11B 5/0245; B03B 9/061; C22B 1/005; C22B 59/00; B07C 5/3412;
(Continued)

(56) References Cited

U.S. PATENT DOCUMENTS 249,110 A 11/1881 Shafer
2,234,663 A 3/1941 Anderegg
(Continued)

FOREIGN PATENT DOCUMENTS

CN 2807407 8/2006
CN 10177590 1/2009
(Continued)

OTHER PUBLICATIONS

Search Report and Written Opinion dated Jan. 6, 2015.
(Continued)

*Primary Examiner* — Lawrence Averick
(74) *Attorney, Agent, or Firm* — Alix, Yale & Ristas, LLP

(57) ABSTRACT

A system and method for reclaiming select components containing rare earth metals of electronic media electronic storage devices such as hard disk drives, solid state drives and hybrid hard drives and destroying the data containing components thereof comprising first devices to loosen various components of the storage device, the components including the components containing the rare earth elements and the data containing portions. Second devices are provided for removing components from the storage device. A holding chassis receives the storage device, and moves the storage device for engagement with the first and second devices. A section is provided for destroying the data containing portion of the electric storage device when it is removed from the storage device.

7 Claims, 21 Drawing Sheets

(51) Int. Cl.

| | | |
|---|---|---|
| B07C 5/34 | (2006.01) | |
| G11B 23/50 | (2006.01) | |
| G06F 21/80 | (2013.01) | |
| B03B 9/06 | (2006.01) | |
| C22B 1/00 | (2006.01) | |
| B02C 18/06 | (2006.01) | |
| B02C 23/08 | (2006.01) | |
| B07C 5/342 | (2006.01) | |
| G11B 5/024 | (2006.01) | |

(52) U.S. Cl.
CPC ............. *B07C 5/3422* (2013.01); *B23C 3/00* (2013.01); *C22B 1/005* (2013.01); *C22B 59/00* (2013.01); *G06F 21/80* (2013.01); *G11B 5/0245* (2013.01); *G11B 23/505* (2013.01); *G06F 2221/2143* (2013.01); *Y02P 10/20* (2015.11)

(58) Field of Classification Search
CPC ......... B07C 5/3422; B07C 5/10; B07C 5/342; B02C 23/08; B02C 18/06; B23C 3/00; G06F 21/80; G06F 2221/2143; Y02P 10/212; B23P 23/04; B65D 79/02; G06K 7/00; H01M 10/54
USPC ................ 241/23, 65, 100, 36, 277, 426.1; 29/403.1
See application file for complete search history.

(56) References Cited

U.S. PATENT DOCUMENTS

| | | | |
|---|---|---|---|
| 2,745,319 | A | 5/1956 | Sawyer |
| 2,980,151 | A | 4/1961 | Arbour |
| 3,237,362 | A | 3/1966 | Fromson |
| 3,587,391 | A | 6/1971 | Pitts et al. |
| 4,693,644 | A | 9/1987 | Takahashi |
| 4,721,257 | A | 1/1988 | Williams et al. |
| 4,729,713 | A | 3/1988 | Takaichi et al. |
| 4,765,764 | A | 6/1988 | Karwan |
| 4,779,810 | A | 10/1988 | Frey |
| 4,880,065 | A | 11/1989 | McDonald et al. |
| 5,009,038 | A | 4/1991 | Yoshikawa et al. |
| 5,064,126 | A | 11/1991 | Hickey et al. |
| 5,149,948 | A | 9/1992 | Chisholm |
| 5,203,067 | A | 4/1993 | Defazio |
| 5,236,139 | A | 8/1993 | Radtke |
| 5,384,956 | A | 1/1995 | Sakurai et al. |
| 5,518,190 | A | 5/1996 | Aebi et al. |
| 5,871,313 | A | 2/1999 | Nenadic et al. |
| 5,930,217 | A | 7/1999 | Kayanuma |
| 5,995,459 | A | 11/1999 | Kappel et al. |
| 6,039,637 | A | 3/2000 | Hutchison et al. |
| 6,065,911 | A | 5/2000 | Airnbad et al. |
| 6,089,434 | A | 7/2000 | Gleason |
| 6,137,893 | A | 10/2000 | Michael et al. |
| 6,241,141 | B1 | 6/2001 | Al-Nabulsi |
| 6,311,100 | B1 | 10/2001 | Sarma et al. |
| 6,375,106 | B1 | 4/2002 | Sears |
| 6,478,515 | B1 | 11/2002 | Mueller |
| 6,588,691 | B2 | 7/2003 | Yamamoto et al. |
| 6,651,859 | B2 | 11/2003 | Raffoni |
| 6,685,119 | B2 | 2/2004 | Castronovo |
| 6,695,240 | B2 | 2/2004 | Rajewski |
| 6,704,982 | B1 | 3/2004 | Cassase et al. |
| 6,725,164 | B1 | 4/2004 | Gadh et al. |
| 6,752,687 | B2 | 6/2004 | Benning et al. |
| 6,902,469 | B2 | 6/2005 | Kondo et al. |
| 6,912,775 | B1 | 7/2005 | Pfeiffer et al. |
| 7,043,055 | B1 | 5/2006 | Silver |
| 7,090,156 | B2 | 8/2006 | Castronovo |
| 7,090,214 | B2 | 8/2006 | Castronovo |
| 7,100,852 | B2 | 9/2006 | Castronovo |
| 7,175,116 | B2 | 2/2007 | Castronovo |
| 7,198,213 | B2 | 4/2007 | Koibet et al. |
| 7,204,436 | B2 | 4/2007 | Castronovo |
| 7,239,399 | B2 | 7/2007 | Duquette et al. |
| 7,240,864 | B2 | 7/2007 | Castronovo |
| 7,308,543 | B2 | 12/2007 | Kishi |
| 7,311,277 | B2 | 12/2007 | Watanabe et al. |
| 7,334,747 | B2 | 2/2008 | Castronovo |
| 7,357,340 | B2 | 4/2008 | Castronovo |
| 7,363,317 | B2 | 4/2008 | Meliksetian et al. |
| 7,427,040 | B2 | 9/2008 | Castronovo |
| 7,448,562 | B2 | 11/2008 | Castronovo |
| 7,539,339 | B2 | 5/2009 | Tanabe et al. |
| 7,562,836 | B2 | 7/2009 | Langston |
| 7,588,206 | B2 | 9/2009 | Hausman et al. |
| 7,607,598 | B2 | 10/2009 | Castronovo |
| 7,667,923 | B1 | 2/2010 | Chontos et al. |
| 7,753,762 | B2 | 7/2010 | Hutchinson et al. |
| 7,761,183 | B2 | 7/2010 | Sullivan |
| 7,880,463 | B2 | 2/2011 | Guzik et al. |
| 7,959,381 | B2 | 6/2011 | Kenzie |
| 8,113,748 | B2 | 2/2012 | Werner |
| 8,251,303 | B2 | 8/2012 | Wozny |
| 8,364,306 | B2 | 1/2013 | Rodriguez et al. |
| 8,610,942 | B2 | 12/2013 | Eguchi |
| 8,851,404 | B2 | 10/2014 | Clark et al. |
| 2001/0009534 | A1 | 7/2001 | Sato |
| 2003/0213531 | A1 | 11/2003 | Conry |
| 2004/0050420 | A1 | 3/2004 | Huang et al. |
| 2004/0252628 | A1 | 12/2004 | Detzier |
| 2005/0257049 | A1 | 11/2005 | Farag |
| 2006/0072244 | A1 | 4/2006 | Rapp |
| 2007/0063082 | A1 | 3/2007 | Coleman |
| 2007/0076537 | A1 | 4/2007 | Klein |
| 2007/0087924 | A1* | 4/2007 | Krosta ............... B23Q 3/15773 483/1 |
| 2007/0147776 | A1 | 6/2007 | Ito |
| 2008/0175684 | A1 | 7/2008 | Schmidt et al. |
| 2009/0127341 | A1 | 5/2009 | Feng |
| 2009/0165292 | A1* | 7/2009 | Amurao ............ H05K 13/0486 29/764 |
| 2010/0145498 | A1 | 6/2010 | Uchikawa et al. |
| 2010/0294865 | A1 | 11/2010 | Wozny |
| 2011/0069322 | A1 | 3/2011 | Hoffer, Jr. |
| 2011/0085863 | A1 | 4/2011 | Shih |
| 2011/0090585 | A1* | 4/2011 | Schwarcz ............ G11B 5/0245 360/57 |
| 2011/0305250 | A1 | 12/2011 | Chann et al. |
| 2012/0091237 | A1* | 4/2012 | Clark .................. G11B 5/0245 241/23 |
| 2012/0137829 | A1 | 6/2012 | Harris et al. |
| 2012/0292415 | A1 | 11/2012 | Wozny |
| 2013/0124620 | A1 | 5/2013 | Madej |
| 2013/0222947 | A1 | 8/2013 | Sugii et al. |
| 2013/0319821 | A1* | 12/2013 | Ko ..................... B02C 18/2225 198/506 |
| 2014/0263216 | A1 | 9/2014 | Clark |

FOREIGN PATENT DOCUMENTS

| | | |
|---|---|---|
| CN | 101789254 | 7/2010 |
| CN | 101794334 | 8/2010 |
| CN | 101954500 | 1/2011 |
| CN | 102319723 | 1/2012 |
| CN | 102661706 | 9/2012 |
| DE | 4435670 | 4/1996 |
| EP | 0 375 526 A1 | 6/1990 |
| EP | 0 503 753 A1 | 9/1992 |
| EP | 0959654 | 11/1999 |
| EP | 1065962 | 11/2001 |
| EP | 1640920 | 3/2006 |
| EP | 1032912 | 8/2007 |
| GB | 2 329 298 A | 2/2004 |
| WO | WO2012072989 | 6/2012 |
| WO | WO2012137063 | 10/2012 |

OTHER PUBLICATIONS

Search Report and Written Opinion dated Sep. 27, 2016.

(56) References Cited

OTHER PUBLICATIONS

"Datenrettung Seagate 7200.10 500GB repair or destroy (DSRocker)" uploaded by Datenrettung, Feb. 18, 2012.
"HddSurgery Spindle Replacement Tools Seagate 7200.10/11" uploaded by HddSurgery-Data Recovery Tools; Jun. 14, 2011.

* cited by examiner

Hard Drive Destruction Machine's Operating System

Barcode reader system

Database of all manufacturer's barcodes of 3.5 inch and 2.5 inch HDDs, SSDs, and HHDs.

Capacity to capture corporate asset tags.

Capacity to read QR and Matrix Codes.

Capacity to save the retrieved information as a Word document or convert it to a PDF that can be stored for future use or delivered electronically to another computer, smartphone or tablet.

Product visioning system

Pictorial database of targeted components in all 3.5 inch and 2.5 inch HDDs, SSDs, and HHDs. The primary components consist of: the hard drive cover, circuit boards, and rare earth metals that including the voice-coil magnets, and spindle coils.

Corresponding x, y, and z numerical coordinates to aid in the identification, destruction and/or extraction of the targeted components.

G-code/conversational programming system

Pictorial database of targeted components in all 3.5 inch and 2.5 inch HDDs, SSDs, and HHDs. The primary components consist of the hard drive cover, circuit boards, and rare earth metals that including the voice-coil magnets, and spindle coil.

Corresponding x, y, and z numerical coordinates to guide the tool path of the milling tool to remove targeted components from the outside to the inside of hard drives.

Pictorial database of rare earth metals, voice-coil magnets and spindle coils, in all 3.5 inch and 2.5 inch HDDs, and HHDs.

Corresponding x, y, and z numerical coordinates to aid in the identification, destruction and/or extraction of the targeted components.

FIG. 1a

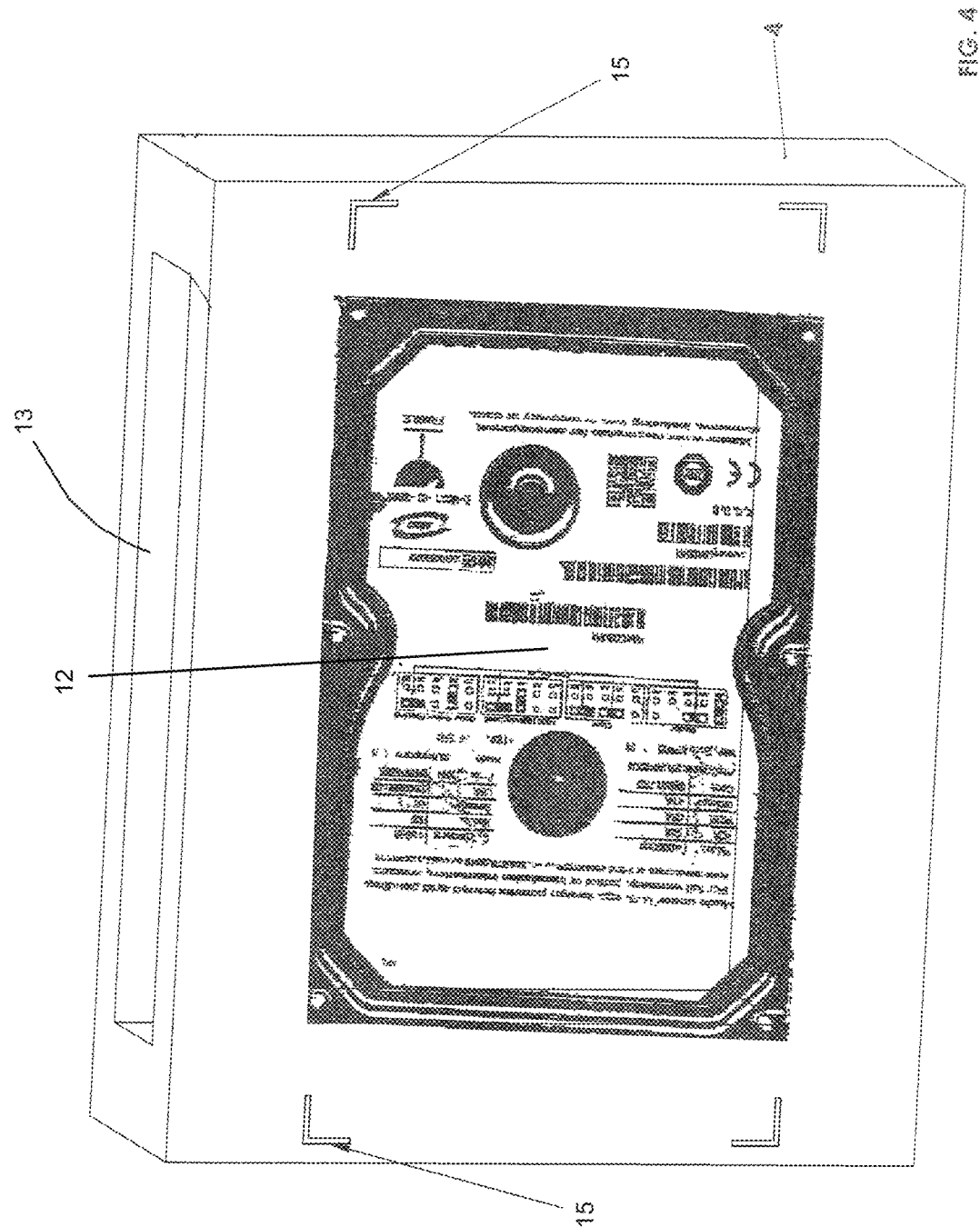

Certificate of Destruction ⌣ 96

Company receiving the service.

Name of Person authorizing the destruction process.

Company personnel witnessing the destruction process.

The time and date of the destruction.

Name of the technician performing the process.

Running count of sub-components collected.

Running count of sub-components and their respective weights.

Additional dismantling demographic variables as needed.

Manufacturer's barcodes with corresponding corporate asset tags.

_____   _____   _____
_____   _____   _____
_____   _____   _____
_____   _____   _____

Retrieved QR and Data Matrix Code information:

_____
_____
_____
_____
_____

Certificate can be printed immediately or saved to a Word document or converted to a PDF that can be stored for future use or delivered electronically to another computer, smartphone or tablet.

HARD DRIVE DISMANTLING SYSTEM

CROSS-REFERENCE TO RELATED APPLICATIONS

This application claims the benefit of U.S. Provisional Application No. 62/188,055, entitled "Hard Drive Dismantling System", filed Jul. 2, 2015, the disclosure of which is incorporated herein by reference in its entirety.

TECHNICAL FIELD

This application relates generally to a system for dismantling various components of a hard drive and more particularly, to a system that will identify and extract selected components from hard drives and destroy the data containing portions of the hard drive.

BACKGROUND

Various types of data are stored on the hard drives of computers. Such data may include personal confidential information concerning individuals. This data may include their social security numbers, financial information, health information and private telephone numbers as examples. The hard drives are also used to store corporate information which may include proprietary information such as developing products, customer lists, and business plans. The government may store confidential information including highly classified information on the hard drives.

When it is desired to replace the computer, the data must be removed from the hard drive so that it cannot be misused by unscrupulous individuals. Merely erasing the data by using the computer commands is not sufficient as the data can be recaptured. This is true even if the hard drive is removed for upgrade purposes. However, even if the hard drive is removed, something must be done to destroy the data.

One way of ensuring that the data cannot be used or recovered from an unwanted hard drive is to completely destroy the hard drive. This has been accomplished in the past by completely shredding the entire hard drive. However, as the hard drive is encased in metal, the complete destruction involves the shredding of a relatively large volume of metal that requires a lot of energy.

Additionally, hard dives use rare earth elements in their construction. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). It is becoming desirable to recycle such elements. The complete destruction of a hard drive does not readily permit the recapture of such elements.

It is thus desirable to have a process and apparatus for reclaiming the elements of the hard drive that contain the rare earth elements and then destroying the data containing portion of the drive.

An example of a hard drive data destroying device that does not destroy the entire hard drive is shown and described in U.S. Pat. No. 8,851,404 entitled Hard Drive Shredding Device, issued Oct. 7, 2014 by Clark et al., the disclosure of which is incorporated herein by reference in its entirety. Another example of such a hard drive data destroying device is shown in co-pending U.S. patent application Ser. No. 14/202,234 entitled Hard Drive Shredding Device, filed Mar. 12, 2013 by Clark et al., the disclosure of which is also incorporated herein by reference in its entirety.

SUMMARY

According to one aspect of the disclosure there is provided a system for reclaiming select components containing rare earth metals of electronic media electronic storage devices such as hard disk drives, solid state drives and hybrid hard drives and destroying the data containing components thereof comprising first devices to loosen various components of the storage device, said components including the components containing the rare earth elements and the data containing portions. Second devices are provided for removing components from the storage device and a holding chassis is provided for receiving said storage device and moving the storage device for engagement with said first and second devices, A section is provided or destroying the data containing portion of the electric storage device when it is removed from the storage device.

According to another aspect there is provided a method for reclaiming select components containing rare earth metals of electronic media electronic storage devices such as hard disk drives, solid state drives and hybrid hard drives and destroying the data containing components thereof comprising loosening various components of the storage device, said components including the components containing the rare earth elements and the data containing portions in a first chamber; removing the loosened components from the storage device in a second chamber; and destroying the data containing portion of the electric storage device when it is removed from the storage device.

BRIEF DESCRIPTION OF THE DRAWINGS

FIG. 1a is a description of the operating system of a machine used for the dismantling of hard drives and the destruction of the data containing portions thereof;

FIG. 4 is an isometric view of the loading chassis of the machine of FIG. 3 with a hard drive positioned therein;

FIG. 8b is an schematic top view of the system of FIG. 8a;

FIG. 19 is an example of a Certificate Of Destruction provided after the operation is complete;

DETAILED DESCRIPTION

In general, the system described herein can be used for dismantling and extracting various components of electronic media storage devices such as HDD, SSD, and HHD hard drives. The HDD (Hard Disc Drive) hard drive is essentially a metal platter with a magnetic coating. The coating stores the data. A read/write head on an arm accesses the data while the platters are spinning in a hard drive enclosure. In SSD (Solid State Drive) hard drives, instead of the magnetic coating on top of platters, the data is stored on NAND flash memory (information pods). The SSD drive has no moving parts. The HHD (Hybrid Hard Drive) hard drive is a hybrid incorporating the HDD and the SSD principles.

Figure 1:
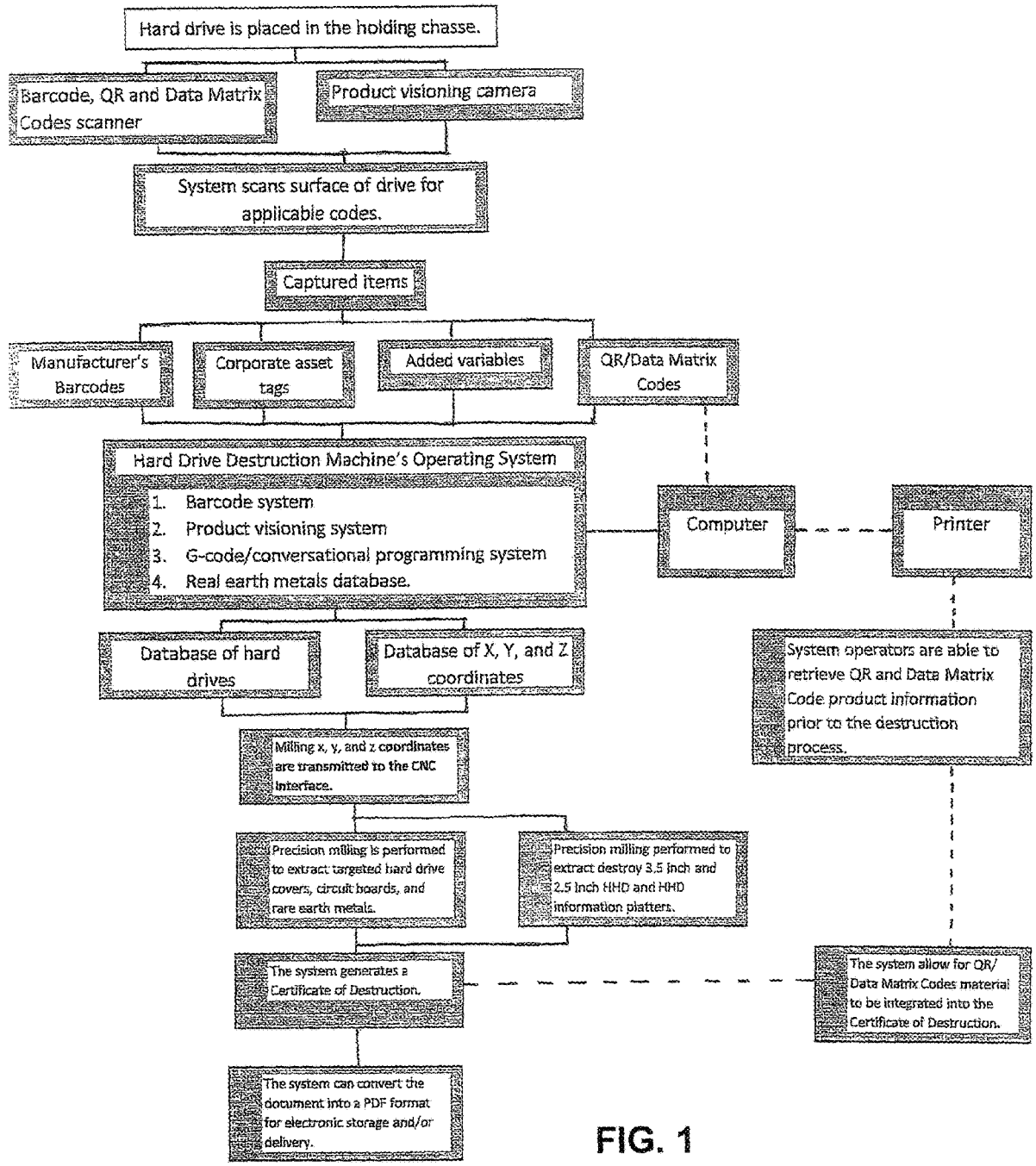
FIG. 1 is flow chart of the operation of the system.
Figure 2A:
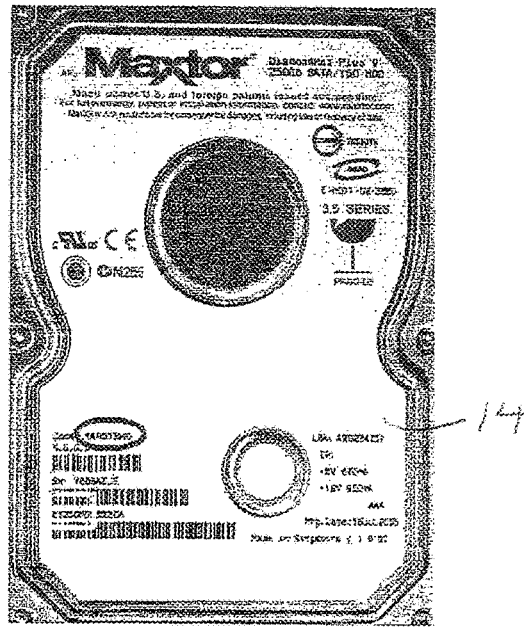
FIGS. 2a-2d are views of various components of a hard drive that may be desired to be recovered from the destruction process.
Figure 2B:
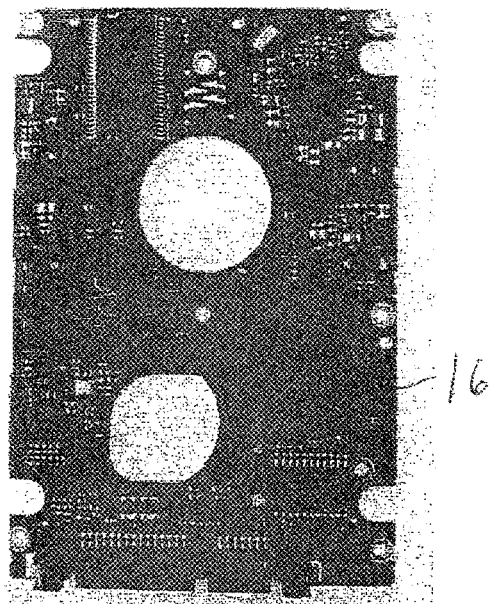
Figure 2C:
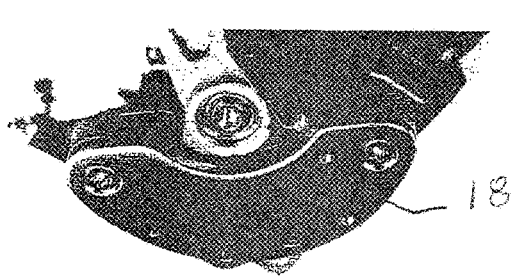
Figure 2D:
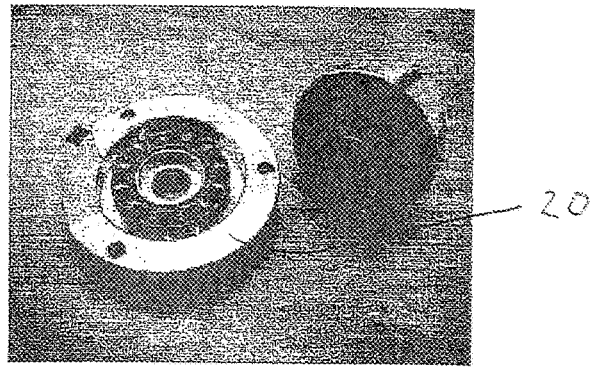
Figure 3:
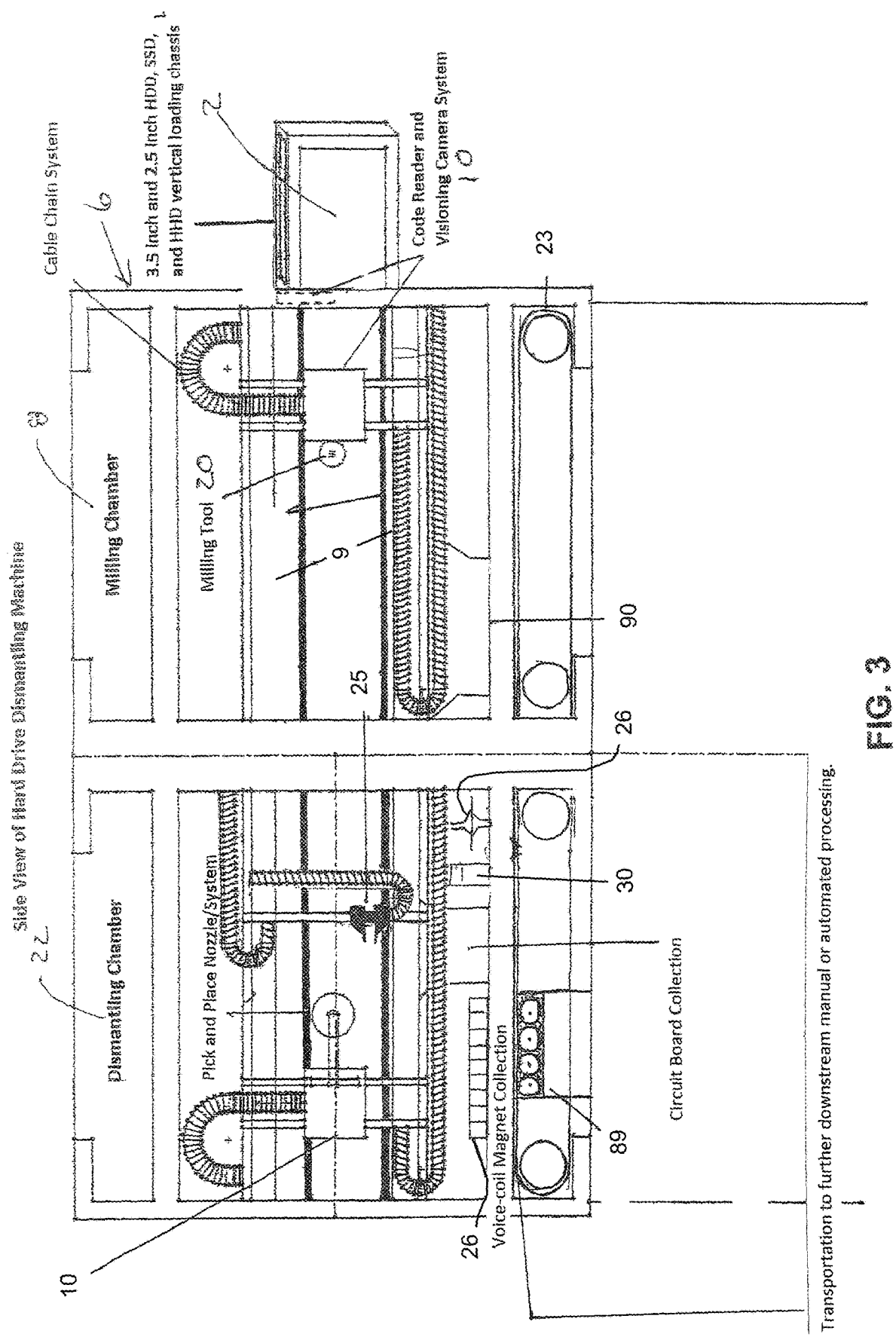
FIG. 3 is an schematic side view of a machine used for the dismantling of hard drives and the destruction of the data containing portions thereof.
Figure 3A:
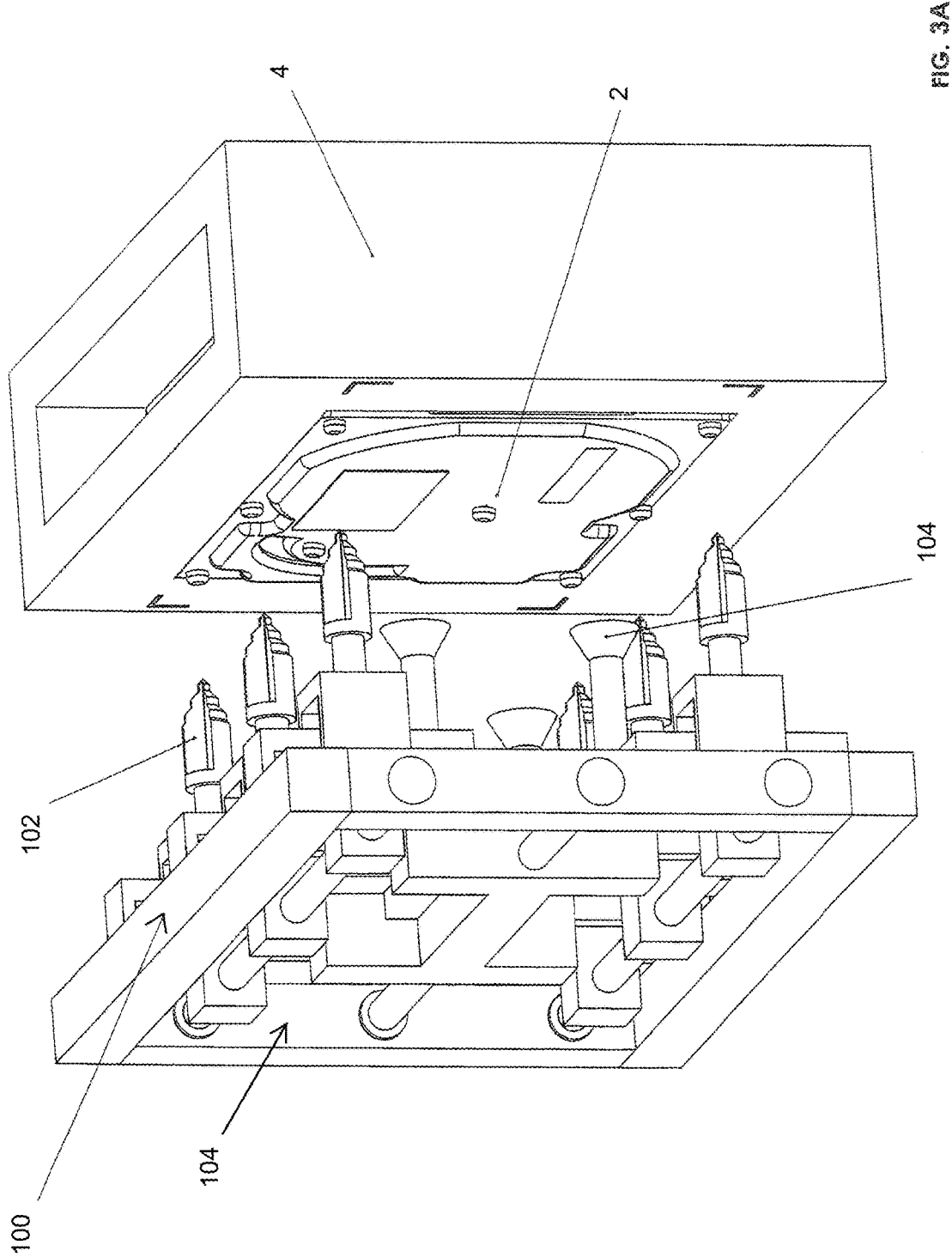

As outlined by the flowchart shown in FIG. 1, the dismantling process of a hard drive 2 is initiated when it is placed into the vertical holding chassis 4 of the dismantling/destruction machine 6 shown in FIG. 3. Then, the drive 2 is automatically indexed into the machine's milling chamber 8 where a scanning system scans the hard drive. A code reader 10 scans the top surface or cover 12 (See FIG. 4) of the drive 2 for its manufacturer's barcode and other appropriate indicators, which are used to identify the make and model of the hard drive. The machine 6 will also simultaneously scan the hard drive with a product visioning camera or integrated smart camera to aid in drive orientation and component recognition. A G-code or conversational programming database will also be a part of the dismantling/destruction machine's product recognition operating system. During the initial scanning of the hard drive, the system will also have the capacity to read QR and Data Matrix Codes. The information retrieved may consist of a link to the manufacturers' or supporting companies' website and provide text content like the location make and model of the respective drives' circuit board along with recovery instructions. The operating system of the dismantling/destruction machine 6 can print the retrieved information prior to beginning or upon completion of the dismantling process. The operating system also has the capacity to save the retrieved information as a Word document or convert it to a PDF that can be stored for future use or delivered electronically to another computer, smartphone or tablet.

When the manufacturers' barcode on the hard drive 2 is successfully captured, the dismantling machine queries its barcode database, which consists of all hard drives, 3.5 inch and 2.5 inch HDDs, SSDs, and HHDs that are currently or were formally available on the market. The system will also accommodate the integration of newly developed memory drives that are produced in the future. The system's barcode database will also interface with a visioning system comprised of a pictorial database cataloging specific components of the various types of drives, which will consist of: a) the manufacturer's barcode on the face cover 12 and top head of the drive; b) circuit boards 14 as well as the orientation of the rare earth metals, which consist of c) the voice-coil magnet 16 and d) the spindle motor "18. The orientation of the hard drive cover 12, circuit boards 14", voice-coil magnets 16, and spindle motors 18 will also be accompanied with specific x, y, and z numerical coordinates with the visioning system to aid in their designated extraction procedure. Additional logistic information can be integrated into the system's database for the removal of other desired components. Based on the type of drive identified in the holding chassis, the program will convey specific dismantling coordinates to the CNC interface, which consist of several dismantling stages that start from the outside of the hard drive to the inside.

The present device includes an operating system that integrates the following; but it has the capacity to be configured into one integrated system or expanded to more than the four systems currently presented. Further, the algorithm of the present embodiment's operating system has the capacity to be integrated, in part or in total, into other manufacturers' systems that are currently being developed or developed in the future:

1). A barcode reader system that has a database of all the manufacturers' barcodes for all the 3.5 inch and 2.5 inch HDDs, SSDs, and HHDs that are currently or were formally available in the market. The manufacturers' barcodes that are captured with the reader will help the overall system determine the specific type of hard drive placed in the holding chassis, either a 3.5 inch or 2.5 inch HDD, SSD, or HHD, which will be conveyed to the product visioning database and G-code or conversational programming database to aid in the selection of the appropriate dismantling sequence to perform on the respective drive. The barcode reading system will have the capacity to capture corporate asset tags placed on the hard drives and couple them with their corresponding manufactures' barcode. The barcode reading system will also have the capacity to read QR and Data Matrix Codes that are directly applied by the manufacturer or third-party source like a governmental agency, public/private corporation or organization. The information retrieved may consist of a link to the manufacturer's or supporting company's website. The code may also provide text content like the make and model of the respective drive's; specs on the drives' circuit board along with recovery instructions. When the QR and Data Matrix Codes of a HDD or HHD drive are scanned by the code reader 10 shown in FIG. 3, it can also provide the location of the drives' rare earth metals; specific dismantling instructions, shipping instructions to appropriate processing facilities, and current commodities pricing. Additionally, the system will be able to produce a Certificate of Destruction to inventory the drives that were dismantled. The certificate can be printed, converted to a PDF to be electronically stored or transmitted.

2). A product visioning system with a database comprised of all the 3.5 inch and 2.5 inch HDDs, SSDs, and HHDs that are currently or were formally available in the market. Each hard drive in the database will have images of their targeted components primarily consisting of: a) the hard drive cover 12, mainly for added product recognition and product orientation within the milling chamber; b) circuit boards 14, c) voice-coil magnets 16, and d) spindle coil 18. The captured images will have corresponding numerical x, y, and z numerical coordinates to aid in the extraction of their targeted components. The product visioning database will also have the capacity to integrate images of other desired components to extract from the drive.

3). A G-code or conversational programming system with a database, of all the 3.5 inch and 2.5 inch HDDs, SSDs, and HHDs that are currently or were formally available in the market, will house the pictorial images of the respective drives' configuration from their exterior to interior including the targeted components shown in FIGS. 2a-2d. Corresponding tool path coordinates will accompany the images to guide the systematic dismantling/removal of components from the hard drive from their exterior to interior. Each of the operating system's databases will have the capacity to integrate information from newly developed memory drives that are produced in the future.

4). The present device also includes a database, which is comprised of a pictorial database of the rare earth metals and their corresponding x, y, and z numerical coordinates on all 3.5 inch and 2.5 inch HDDs and HHDs that are currently or formerly available on the market. The database has the capacity to integrate newly developed memory drives, containing rare earth metals that are produced in the future.

As shown in FIG. 3, the present machine 6 includes a milling tool 14 having two single head milling units that will be positioned over the front and back respectively of the hard drive 2 in the milling chamber 8 of the machine 6 to perform either a HDD, SSD or HHD dismantling process. Along with the type of drives stored in the program's database are the drives' corresponding x, y, and z numerical coordinates, which will be interfaced with a database consisting of specific G-codes or conversational programming used to direct the path of the milling tools in removing the fastening screws, on the drives, using a countersink or boring method. The present embodiment can also integrate a multi-headed milling fixture for removing the hard drives' fastening screws.

The dismantling process will be conducted on both sides of the hard drive, at the same time, in the following stages:

Stage 1: Prior to processing hard drives, all external hardware like mounting clips as well as plastic and metal casing need to be removed. The hard drive 2 will be placed, on its edge, in the vertical holding chassis 4 having an open center and which is mounted to a loading table. There are two distinct holding chassis; one for 3.5 inch drives and the other for 2.5 inch drives. When the hard drive 2 is introduced to its appropriate holding chassis it will automatically index into the milling chamber 8. Holding clamps 15 in the perimeter of the holding chassis 4 will secure the hard drive 2 in place during the dismantling process. Both the barcode scanner and visioning camera 10 will proceed to scan the drive. The present machine will also be able to process hard drives that have their covers removed and the information platters milled out. These particular hard drives will be identified by the manufacturer's barcode placed on the top edge of the hard drive.

Once the drive 2 has been identified, coordinates received from the system's databases will be transmitted to the system's CNC interface directing the speed, depth and positioning of the milling spindle to bore out specific fastening screws from the cover of the drive 2. On specific hard drives, a wedging mechanism will be inserted along the outer edge of the drive's cover to help break the adhesive seal (not shown). At the same time, the milling tool 14 over the backside of the hard drive will receive coordinates from the databases to bore out screws, which are holding the drive's circuit board in place.

Once both sides complete the removal of their respective screws, the vertical holding chassis 4 will index forward into the dismantling chamber 22 to allow the cover 12" of the drive and the circuit board 14 to be removed using a pick and place mechanism 22 including a suction nozzle, and then release the components into segregated containers 25 below the dismantling chamber 22. The milling tool 20 used to bore out the screws attached to the cover of the hard drive can also be automatically exchanged for an edging tool, which cuts around the perimeter of the hard drive cover. The described embodiment can be adapted with cooling nozzles that emit air, $CO_2$, $LN_2$, or micro lubricants in the form of a mist on the drive or through holes in the milling tools for better performance and extended wear (not shown). The described dismantling system can also be programmed to recover other desired components inside the hard drive.

Figure 5:
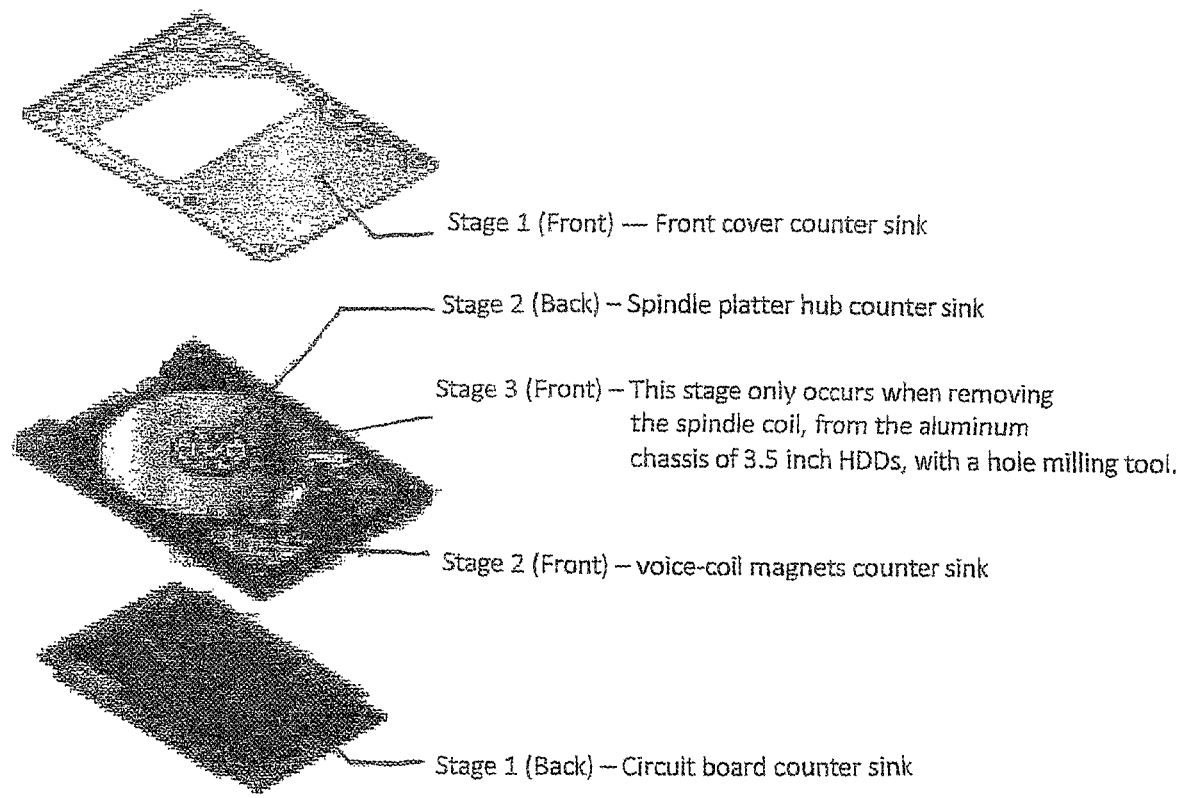
FIG. 5 is a showing of the dismantling sequence for 3.5 inch and 2.5 inch hard disc drives (HDDs)
Figure 6:
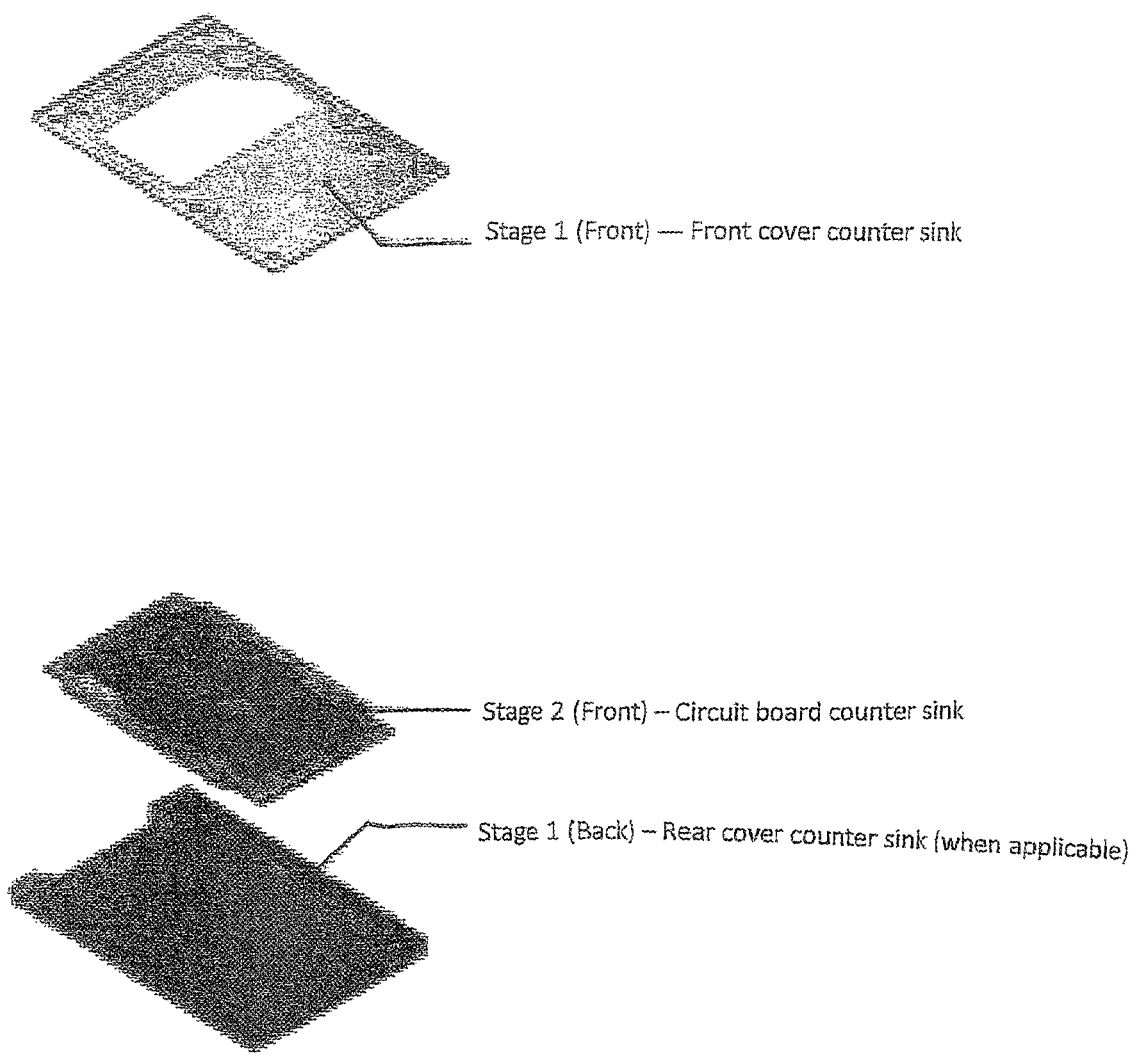
FIG. 6 is a showing of the dismantling sequence for 3.5 inch and 2.5 inch solid state drives (SSDs)
Figure 7:
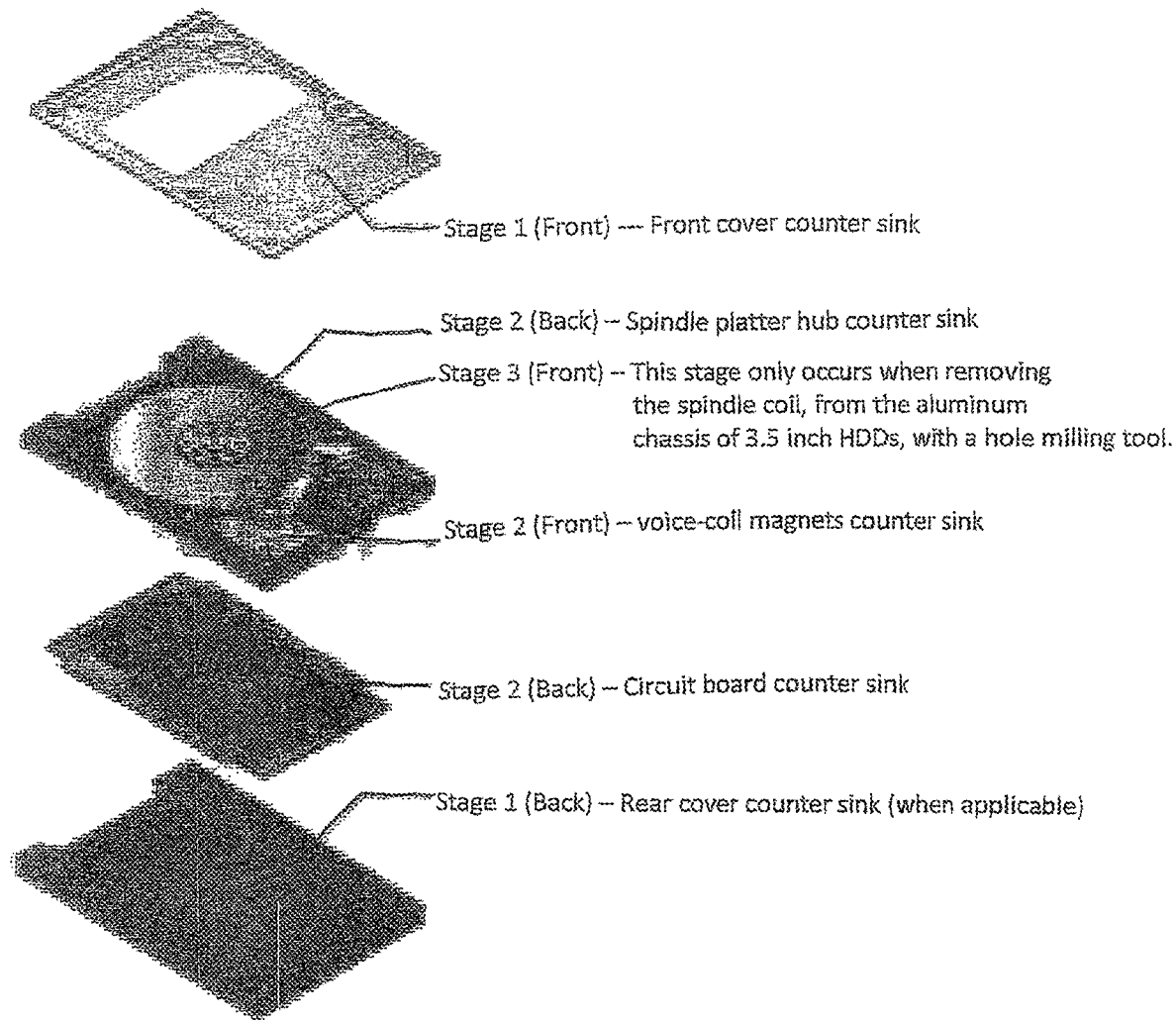
FIG. 7 is a showing of the dismantling sequence for 3.5 inch and 2.5 inch hybrid hard drives (HHDs)

FIGS. 5-7 show the dismantling sequence of the various hard drives.

Stage 2: The vertical chassis 4 holding the drive 2 is indexed back into the milling chamber 8 where logistic coordinates from the system's databases again direct the milling tool 20 over the front of the hard drive, to bore out specific screws that are holding the voice coil magnets in place, while the milling tool 14 over the back of the hard drive will receive coordinates from the system's databases, to bore out the fastening screws that are holding the voice coil magnet from the back. The procedure for removing the rear fastening screws, of the voice coil magnet 16, can also be performed during Stage 1 when the circuit board is being removed, by boring out targeted holes through the circuit board where the rear fastening screws are located. The milling tool 20 will also be directed to bore out a hole in the rear assembly of 3.5 inch HDD and HHD spindle hubs, which will enable the platters to be released during the pick and place process.

When Stage 2 of the milling process is complete, the vertical hard drive holding chassis indexes forward to the dismantling chamber 22 to allow the pick and place mechanism 24 to retrieve the voice-coil magnets "16" from the hard drive with a suction nozzle. A clamping mechanism (not shown) can also be integrated into the pick and place mechanism 24, to provide a more aggressive method for retrieving the magnets. Then the coupled voice-coil magnets 16 are dropped into compartmentalized holding containers 26 that prevent the magnets' magnetism from interacting with the other magnets that have been collected.

Figure 8A:
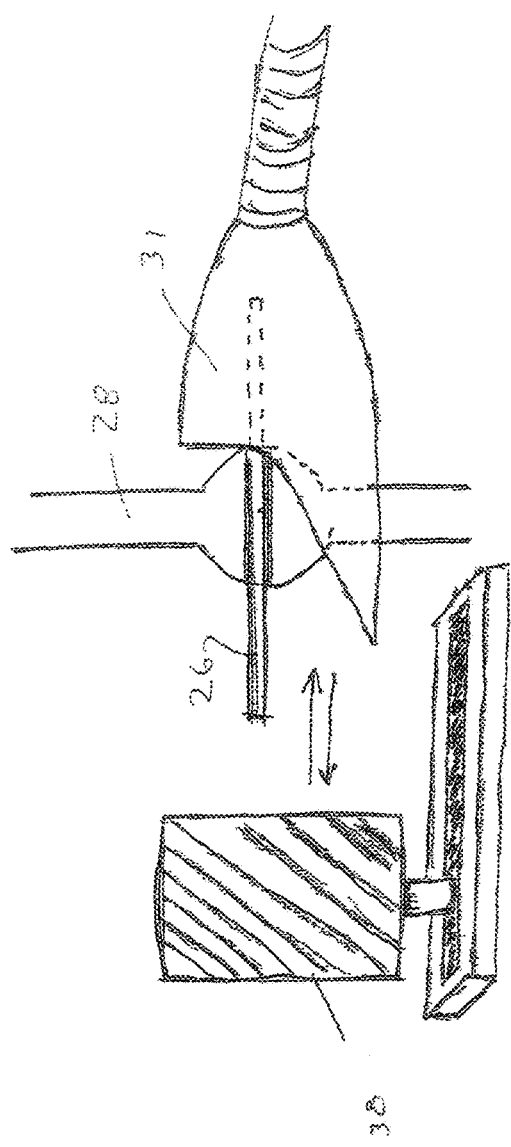
FIG. 8a is a schematic side view of a system for milling 3.5 inch HDD and HHD.
Figure 8B:
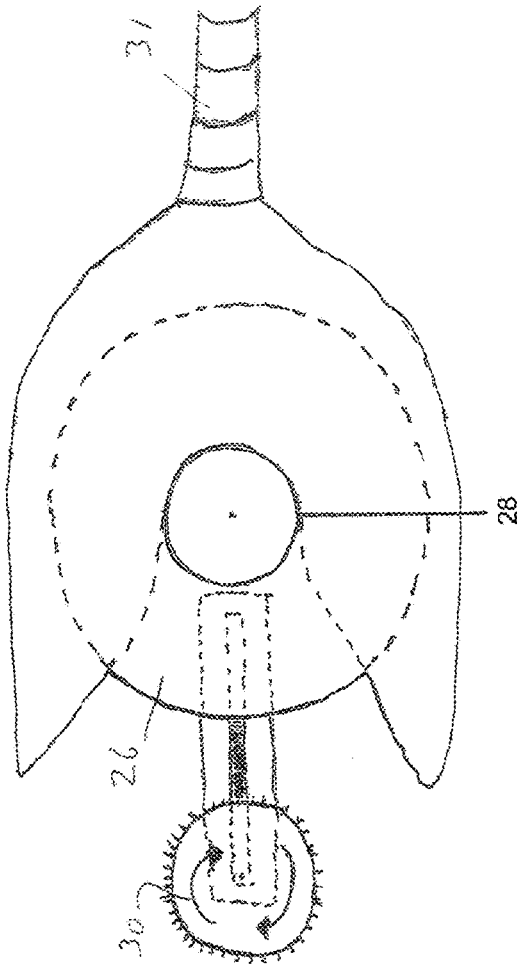

During the period in which the voice-coil magnets 16 are removed, the pick and place mechanism 24 also removes the information platters 26 from the hard drive casing using the suction nozzle of the pick and place mechanism 24. Referring to FIGS. 8a and 8b, in most instances, the platters 24 from the 3.5 inch HDDs and HHDs are still mounted to the spindle hub. Then the platters 26, containing stored information, and the spindle hub configuration are placed in a nesting clamp 28, which allows the platters to securely spin while a milling tool 30 grinds away the platters 26 from their outer edge to the inner spindle hub connection. The nesting clamp 28 can also accommodate 3.5 inch platters that are dislodged from the spindle hubs. The metal filings that are created are collected with a vacuum system 31.

As shown in FIGS. 9-12b, the milling of the 3.5 inch platters can be performed with one or more milling tool configurations. In all cases, the information stored on the platters is destroyed.

Figure 9:
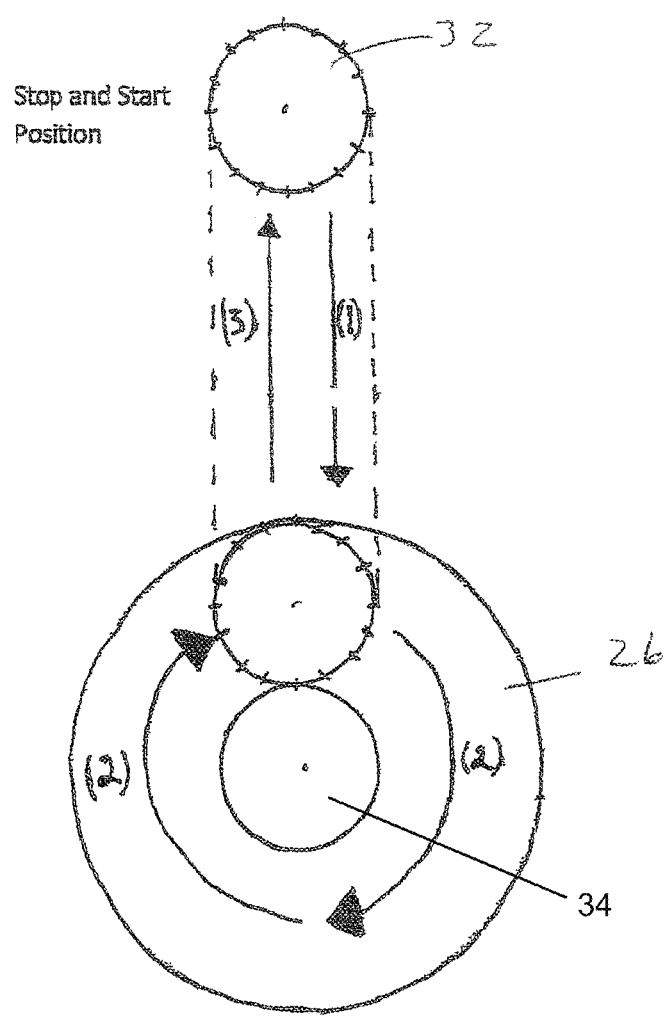
FIG. 9 is a schematic top view of an alternative method of milling the hard drive.

FIG. 9 shows schematically another method of shredding the platters 26. A single cutting tool 32 is mounted in a suitable mechanism that is guided in a track to move the cutting tool 32 toward the hub 34 of the platter 26. Once the rotating cutting blade of the cutting tool 32 pierces the outer portion of the platter and reaches the platter hub 34, moving along the path indicated by the arrows (1), the cutting tool 32 follows a clockwise 360-degree cutting track around the platter hub 34, indicated by arrows (2), shredding the hard drive platters 26 so that the only thing that remains of the hard drive platters 36 are small metal shavings. Once the cutting tool 32 has completed the 360-degree cutting path around the hub 34, the cutting tool 32 returns to the start position along the path indicated by arrows (3).

Figure 10:
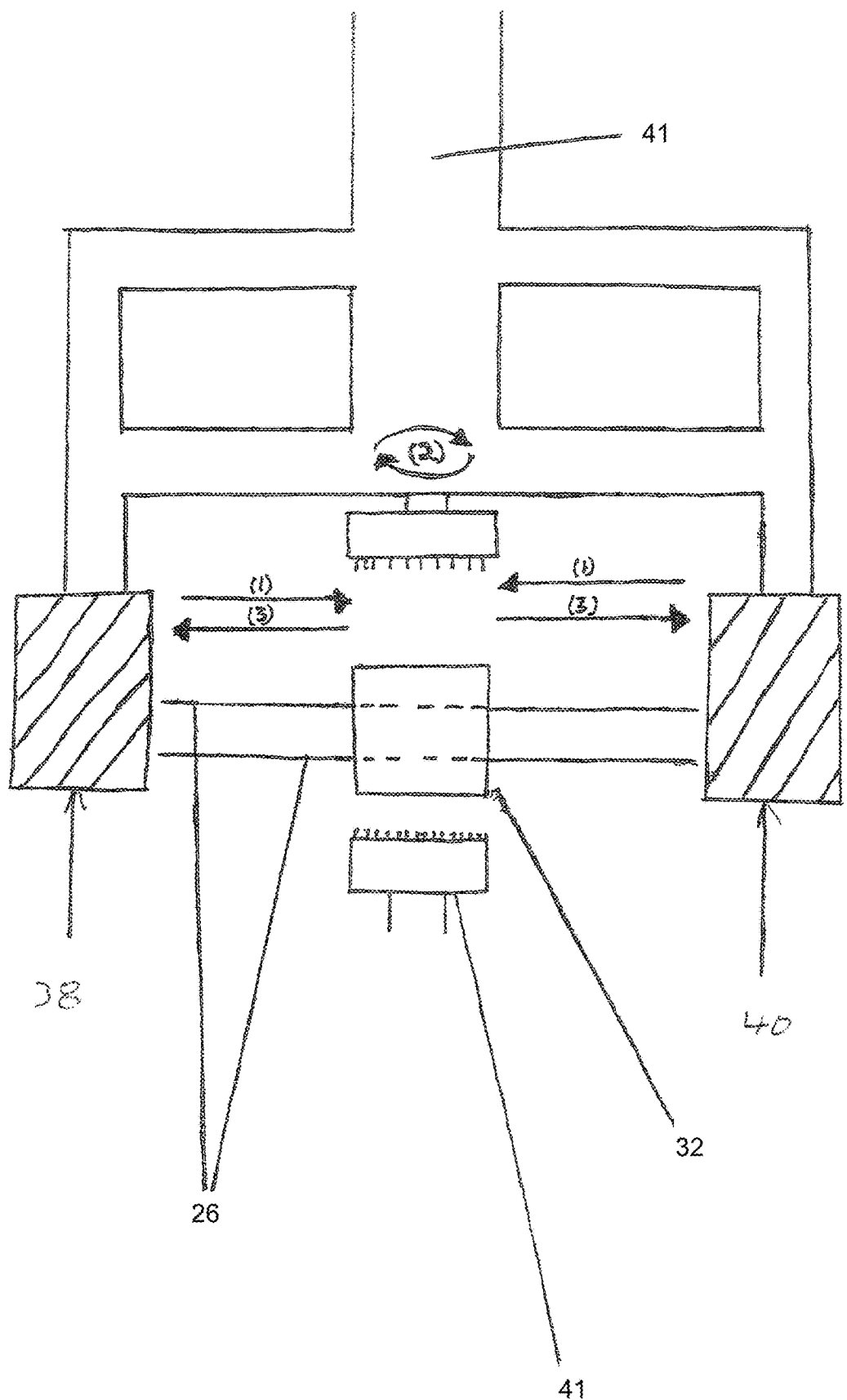
FIG. 10 is a schematic side view of another alternative method of milling the hard drive.
Figure 11:
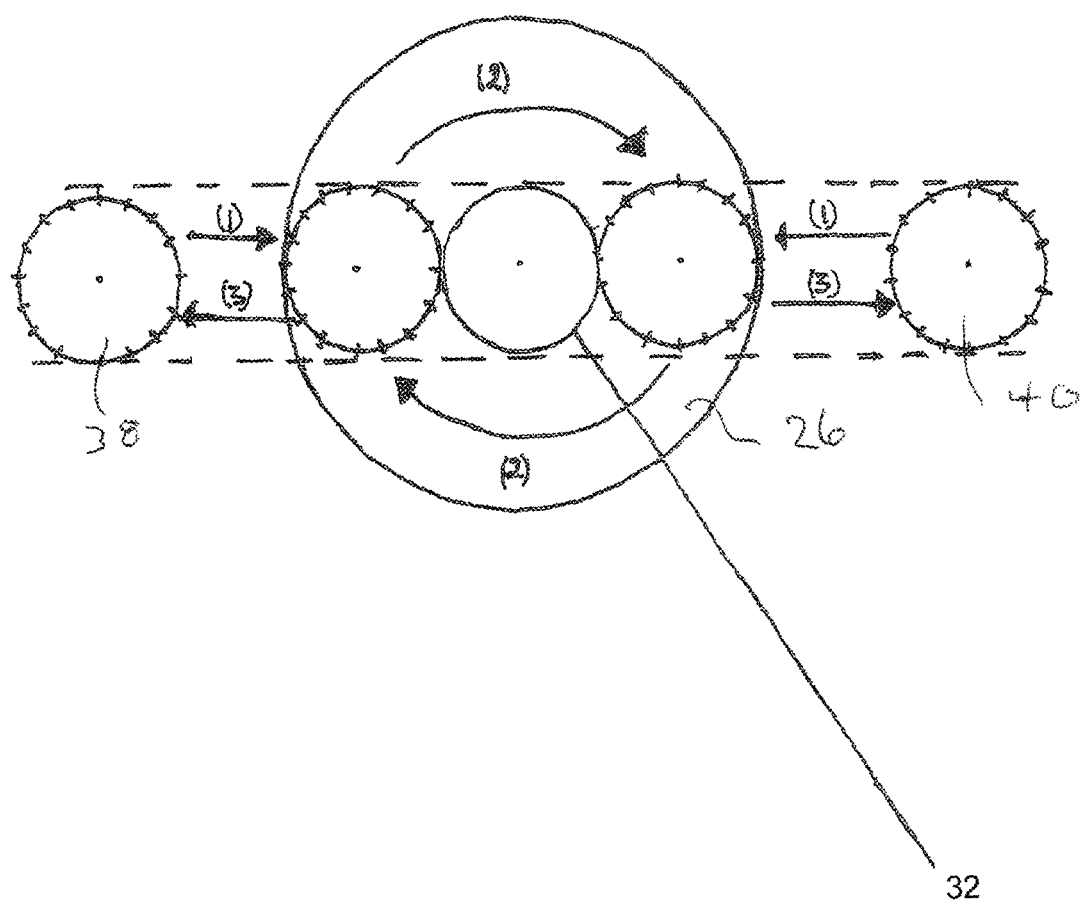
FIG. 11 is a schematic top view of the alternative method of milling the hard drive shown in FIG. 10.

FIGS. 10 and 11 show schematically yet another method of shredding utilizing two cutting tools 38 and 40. As shown, the cutting tools 38 and 40 are mounted one to either side of the hard drive 30. The cutting tools 38 and 40 are mounted on suitable mechanisms that can be moved in tracks to move each cutting tools 38 and 40 toward the hub 32 of the platters 26. A hard drive platter clam 41 clamps the platters 26 and prevents them from rotating. Once the rotating cutting blades of the cutting tools 38 and 40 pierce the outer portions of the platters 26 and reach the platter hub 34, the mechanism moves the cutting tools 38 and 40 around an axis extending through the center of the hub 32 as shown. The cutting tool 38 is moved clockwise from nine to three o'clock and the other cutting tool 40 is moved clockwise from three to nine o'clock around the platter hub 34 as indicated by the arrows (2) leaving only shavings.

Once the cutting tools 38 and 40 complete the 180-degree cutting path around the platter hub 34, the movement of the cutting tools 38 and 40 is reversed and the cutting tools 38 and 40 are returned to their original position.

Figure 12:
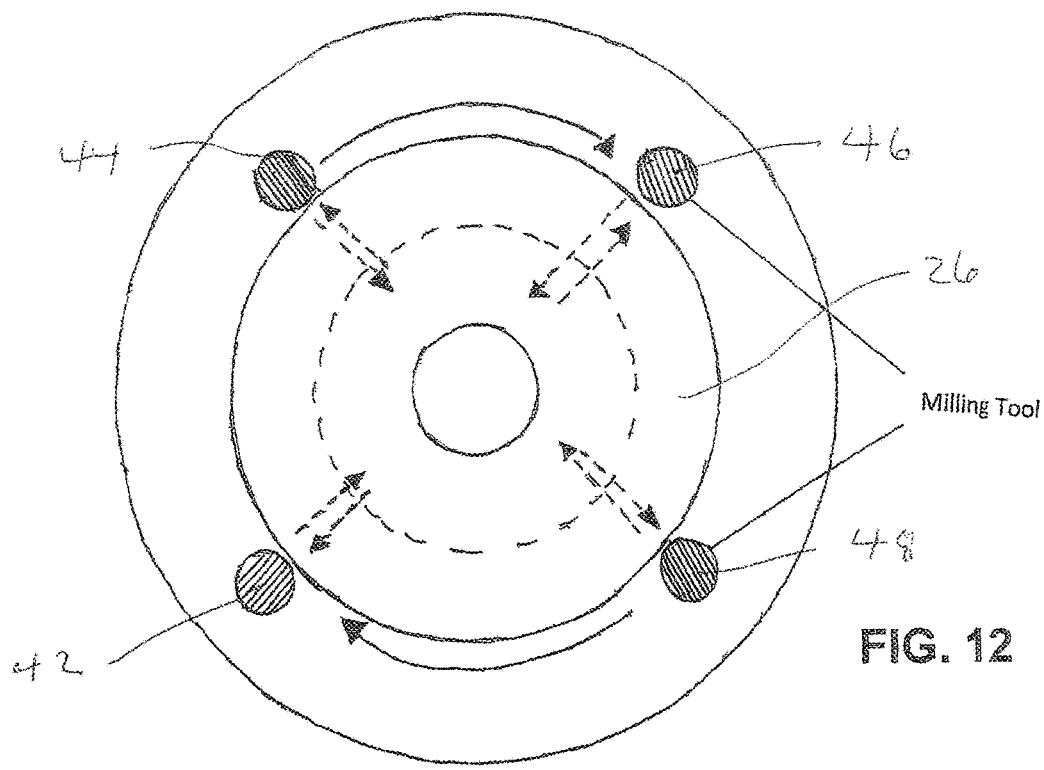
FIGS. 12 and 12a are schematic top and side views of yet another alternative method of milling the hard drive.
Figure 12A:
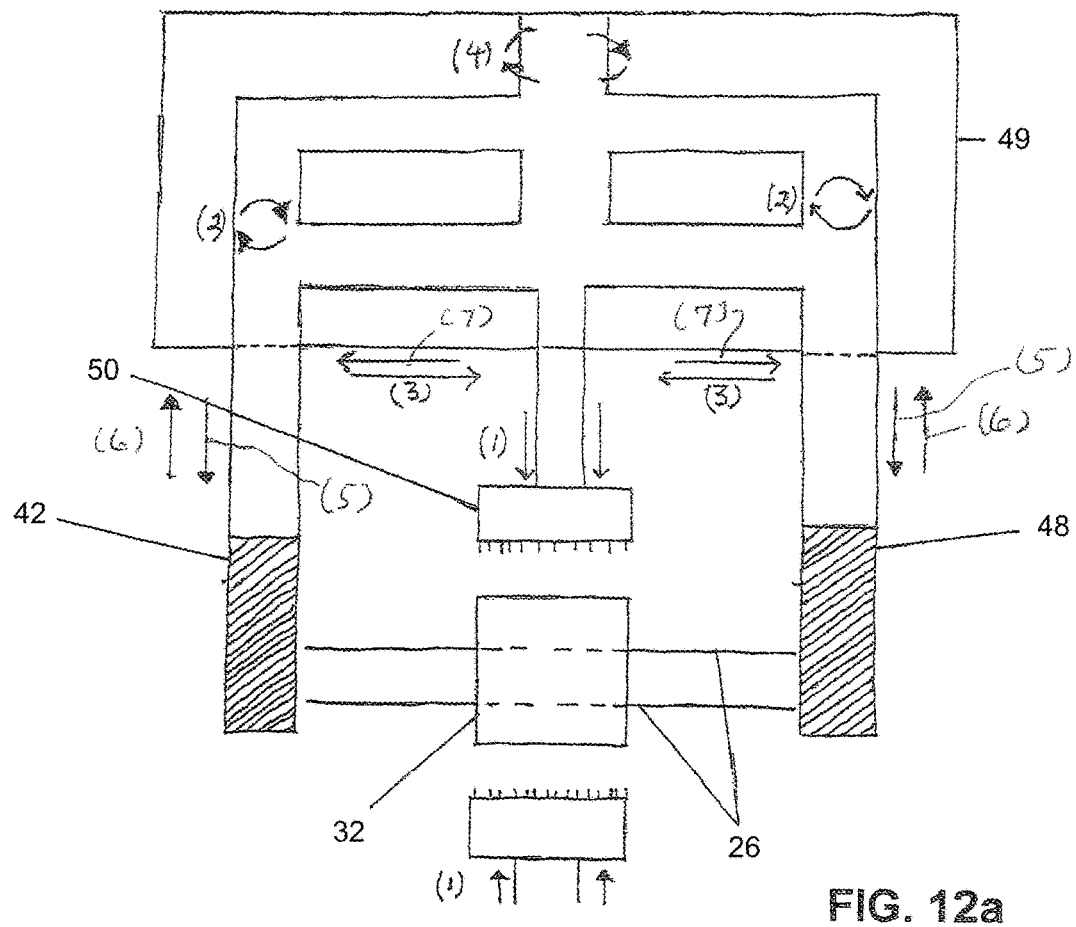

FIGS. 12a and 12b schematically represent another method of shredding platters 26. As shown, there are four milling tools 42, 44, 46 and 48 mounted around a circle having a diameter slightly greater than the outside diameter of the platters 26 and initially positioned above the platters 26. These milling tools 42, 44, 46 and 48 are shaped like a drill bit in that they have a side cutting edge 49 and use their sides 51 to grind away the platters 26. The milling tools 42, 44, 46 and 48 are mounted on suitable mechanisms that can be moved in tracks to reciprocate each milling tools 42, 44, 46 and 48 vertically toward and away from the platters 26 and horizontally toward and away from the hub 32 of the platters 26.

In operation, a hardware drive platter clamp 50 clamps, applies pressure to, the hub of the hard drive 32 and each cutting tool is rotated about its axis as indicated by the arrows (2). The milling tools 42, 44, 46 and 48 are spun about their individual axes and lowered toward the platter 26 in the direction of arrows 5 until the lower ends of the milling tools 42 44, 46 and 48 pass the platters 36 in the hard drive 30. The milling tools 42 44, 46 and 48 are then rotated around the axis of the hub 32 as indicated by the arrows 4 and at the same time, each milling tool 42 44, 46 and 48 moves radially inward toward the hub 32 as indicated by the arrows 3 grinding the platters into small particles.

When the milling tools 42 44, 46 and 48 reach the hub 33, the movement is reversed and the milling tools 42 44, 46 and 48 are rotated about the hub back to their original position. At the same time the milling tools 42 44, 46 and 48 are move radially outward as indicated by the arrows 7 into their outermost position. Simultaneously, the milling tools 42 44, 46 and 48 are raised as indicated by the arrows 6 into their original position.

Figure 13:
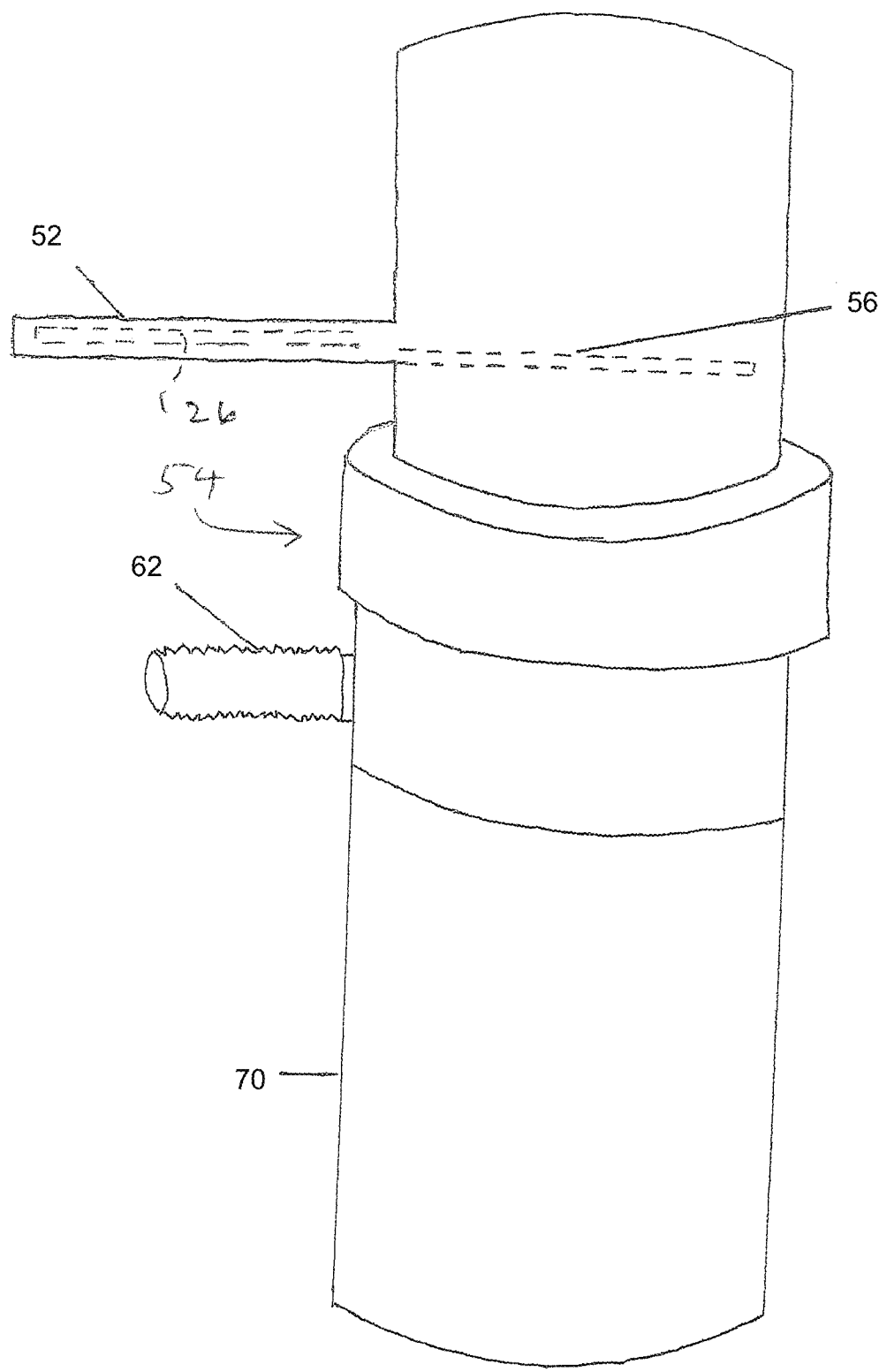
FIG. 13 is a side view of a burr grinding system for destroying 2.5 inch HDD and HHD data containing platters.
Figure 14A:
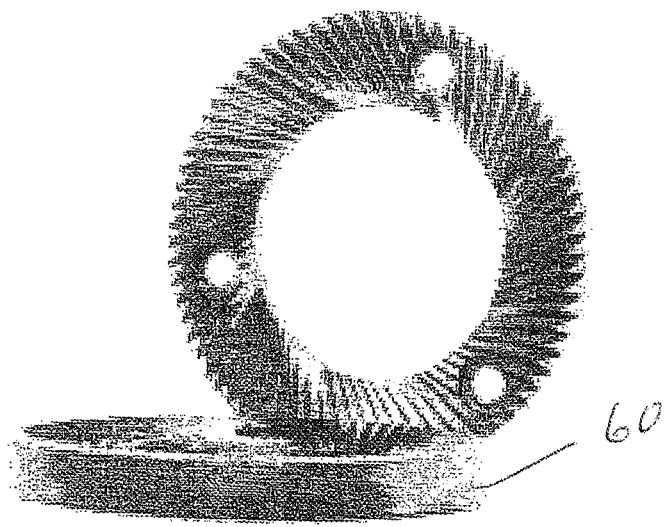
FIGS. 14a and 14b are isometric views of a flat burr grinder and a conical burr grinder respectively used in the burr grinding system.
Figure 14B:
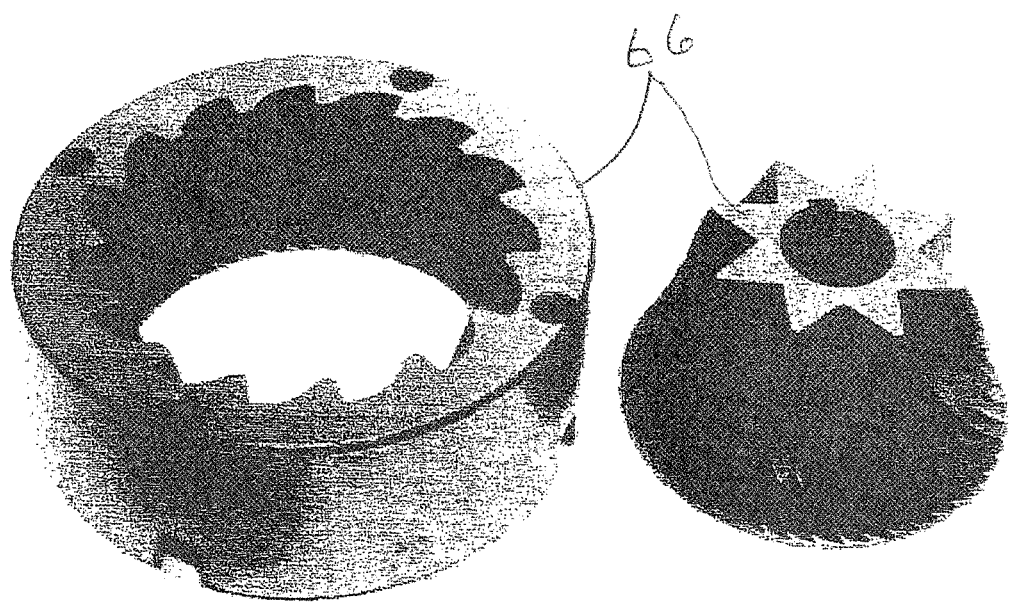
Figure 15:
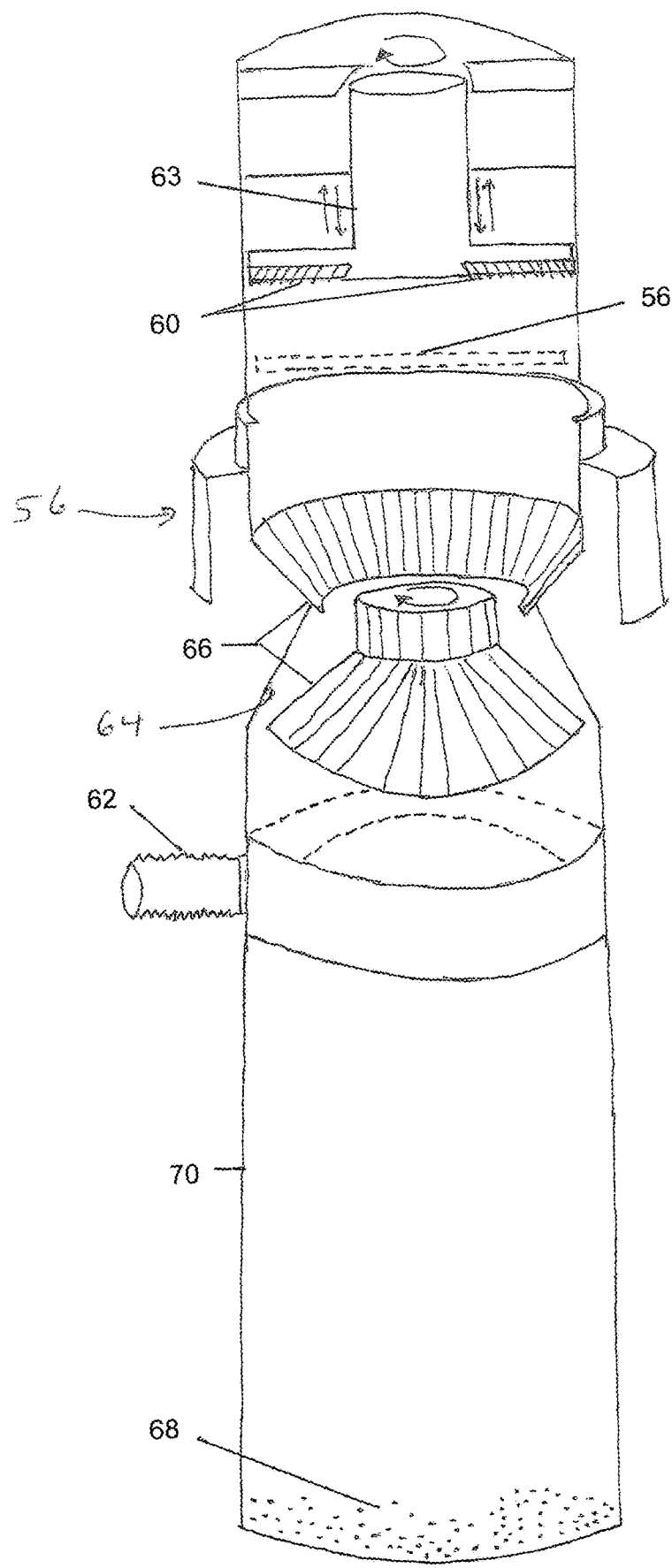
FIG. 15 is a schematic isometric sectional view of burr grinding system of FIG. 13.
Figures 16A, 16B, 16C, 16D:
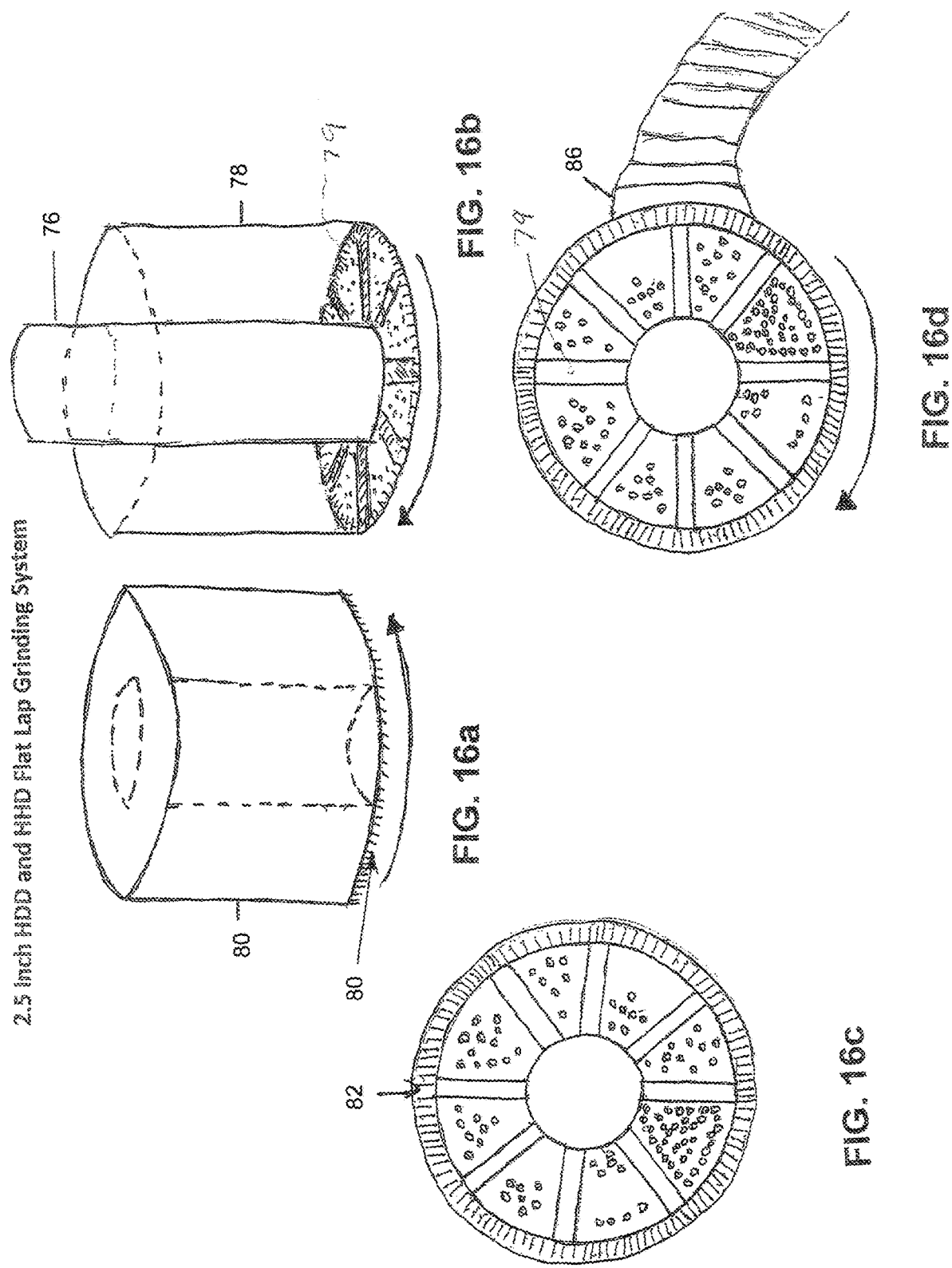
FIGS. 16a-16d are various isometric views components of a 2.5 inch HDD and HHD lapidary flat lap grinding system.
Figure 17:
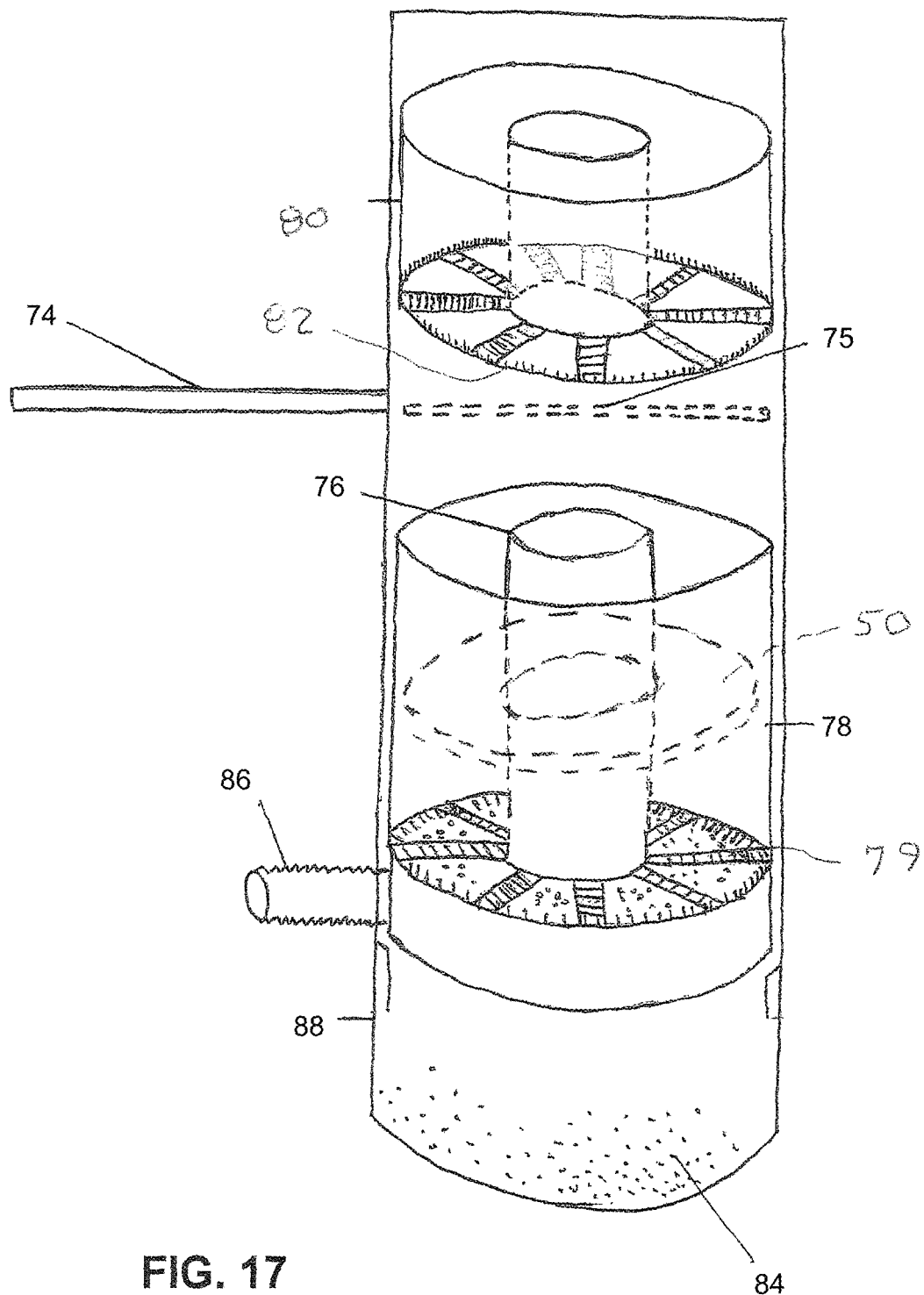
FIG. 17 is a schematic cross-sectional view of a flat lap grinding device using the components of FIGS. 16a-16d.

Unlike 3.5 inch HDD and HHD platters that are primarily made of ridged aluminum, the handling and destruction of 2.5 inch HDD and HHD information platters require more care because of their fragile composition consisting of glass coated ceramic disks. Their method of destruction as shown in FIG. 13 comprises the pick and place system 24 removing the 2.5 inch platters 50 from the partially disassembled hard drive and placing them individually on a platter reception tray 52 of a burr grinding device 54. The platters 50 are then automatically indexed into the milling chamber 58 of the burr grinding device 54 through a slotted port 56. Inside the milling chamber 58, there is a rotating flat burr grinder 58 of the type shown in FIG. 14a above the inserted platter 50, which periodically plunges down to break the platter 50 into small pieces. A vacuum system 62 is used to help draw the platter fragments through a cone shaped receptor 64 into a conical burr grinder 66 of the type show in FIG. 14b. The conical burr 66 reduces the platter fragments into a powder consistency 68, which is deposited into a collection receptacle 70.

Another method that can be used to destroy 2.5 inch HDD and HHD platters 50 is the use of a modified lapidary flat lap grinding device 72 as shown in FIGS. 16a-16d and 17. The pick and place mechanism 24 carefully removes the glass coated ceramic platters 50 from the partially disassembled hard drive and places them individually on a platter reception tray 74. The platter 50 is then automatically indexed into the body of a lap mill grinding device 72 through a slotted port 75. The platter 50 is then placed around the centering spool 76 of a bottom grinding mill 78 that has a grinding surface 79 facing upwardly. Next, a weighted top mill 80, with a grinding surface 82 on its bottom, is placed over the bottom grinding mill 76. By sandwiching the platter 50 between the top and bottom grinding mills 82 and 78, continuous pressure is applied to both surfaces of the platter; and it prevents the partially ground platter particles from escaping. The top and bottom grinding mills 82 and 78 rotate counter-clockwise to each other until the information bearing platter 50 is reduced to a pulverized residue 84. The remains are collected with a vacuum system 86 and deposited into a collection receptacle 88. The spindle motor, which contains rare earth metals, can also be retrieved at this point.

Stage 3 in the overall process: The 3.5 inch aluminum hard drive casing is indexed back into the milling chamber 8 where the milling tool 20 is automatically exchanged with a hole cutting tool (not shown) which proceeds to bore out the spindle motor embedded in the base of the hard drive casing. The aluminum slug containing the spindle motor falls into the holding tray 90 below shown in FIG. 3.

Because of the comprehensive dismantling sequences stored on the system's databases, the present embodiment has the ability to dismantle hard drives that have varying layers of assembly. The system's programming further allows the integration of additional coordinates for the removal of other desired components from the hard drive.

The described dismantling process can also be performed in a linear fashion where the hard drive is placed in the vertical holding chassis; and then advances forward through a series of dismantling chambers and pick and place stations without having to index back and forth between the dismantling chamber and the pick and place station.

Figure 18:
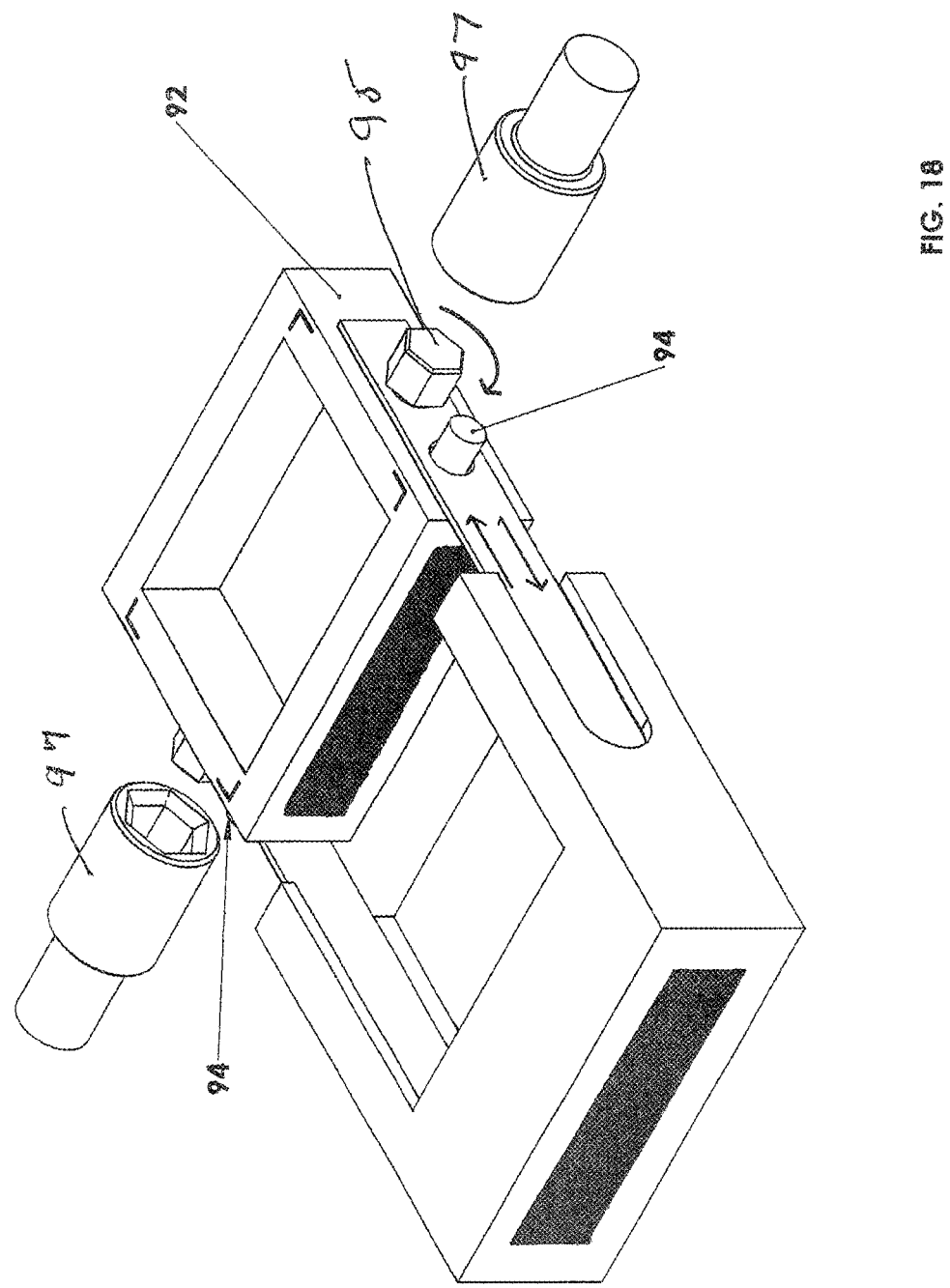
FIG. 18 is an isometric view of a 180 degree holding chassis.

The present system can also be configured to perform the dismantling process horizontally where the milling tool is positioned over the hard drive in the milling chamber; and then the hard drive holding chassis is indexed forward for the pick and place mechanism to remove the desired components After the targeted components are retrieved, a modified hard drive holding chassis 92 as shown in FIG. 18 rotates 180 degrees along the y axis, performing a Gamma rotation, to position the bottom-side of the hard drive facing up toward the milling tool. Locking pins 94 on either side of the rotating hard drive chassis secure it into position. Then the holding chassis indexes back into the milling chamber for the next stage of designated screws to be removed. The dual sequence continues, between the milling chamber and the pick and place station, until the desired components have been removed.

The described embodiment can also be performed in a semi-automated manner where the system's operator can perform a manual extraction of the components while relying on the system's automated disassembly process to remove the fastening screws. The configuration of the semi-automated dismantling method will position the manual component extraction stage to the right of the automated dismantling compartment. The dismantling machine will also have the option of being configured with an automated hard drive "magazine" loader or performed manually.

Although the present embodiment describes various stages for dismantling the hard drive, the process can be configured to automatically perform the operation within a single stage.

The dismantling machine's computer interface, linked by an Ethernet cable or wireless connection, will allow the present embodiment to be performed and monitored onsite or remotely requiring minimal or no human interface. The computer interface will also allow for programmatic updates to the system's databases.

The dismantling machine's operating system keeps track of the drives that are introduced to the system. When the destruction process is completed a Certificate of Destruction 96 such as shown in FIG. 19 can be generated which, consists of the manufactures' barcodes from the dismantled drives and the corresponding company asset tags (if present). The captured identification numbers will automatically populate the fields in the Certificate. The Certificate will also consist of the company receiving the service, name of person authorizing the dismantling process, company personnel witnessing the dismantling process, the time and date of the dismantling; and the name of the technician performing the dismantling process.

Additional variables can be added to the Certificate if required like a running count of components collected and their weights can also be tracked along with other dismantling demographics for productivity reports. However, some of the previously stated variables may not be utilized based on where the company operating the dismantling machine is positioned in the products recovery continuum. The operating system will also allow for the contents of the Certificate to be included with the material retrieved QR and Data Matrix codes to be printed immediately or saved to a Word document or convert it to a PDF that can be stored for future use or delivered electronically to another computer, smartphone or tablet.

The system can be adapted for the dismantling of cell phones, smartphones, laptops, tablets, and flat panel televisions.

The invention claimed is:

1. A method for reclaiming select components containing rare earth metals of an electronic media electronic storage device selected from the group consisting of hard disk drives, solid state drives and hybrid hard drives and destroying the data containing components thereof comprising:
   scanning a storage device having a data containing portion to obtain location data for select components containing rare earth metals;
   automatically loosening various components of the storage device using said location data, said components including the components containing rare earth metals and the data containing portions in a first chamber;
   transporting the storage device from the first chamber to a second chamber;
   removing the loosened components from the storage device in the second chamber; and
   destroying the data containing portion of the electric storage device when it is removed from the storage device.

2. The method of claim 1 wherein the storage device has a cover and a circuit board and the cover and the circuit board are loosened from the storage device and then removed and retrieved.

3. The method of claim 1 wherein the storage device has a data retaining platter and further comprising removing the data retaining platter from the storage device and shredding the platter.

4. The method of claim 3 including grinding the platters into a powder consistency.

5. The method of claim 1, including coring out a platter spindle hub of a hard drive in said first chamber.

6. The method of claim 1 further comprising placing the components containing rare earth metals in a container or on a conveyor belt.

7. The method of claim 1 further comprising generating a certificate of destruction.

* * * * *